May 5, 1959  D. E. STEM  2,885,081
MAGNETIC TRAPS
Filed Sept. 13, 1954

INVENTOR.
DONALD E. STEM
BY George B White
ATTY

2,885,081
MAGNETIC TRAPS

Donald E. Stem, Santa Rosa, Calif.

Application September 13, 1954, Serial No. 455,489

2 Claims. (Cl. 210—222)

This invention relates to a magnetic trap and particularly a so-called high pressure magnetic trap.

The primary object of the invention is to provide magnetic trap for fluid lines where a permanent magnet separator separates from liquid and slurries magnetic particles especially in cases where the pressure exceeds the capacity of the flow line trap of the usual type.

Another object of the invention is to provide a magnetic trap for fluid lines or liquid particularly those of high viscosity such as oils, margarine and the like, which trap achieves the maximum in magnetic protection for removing magnetic particles from such liquid passing through a conduit; and in which two forces are utilized in the trap to trap such magnetic particles, namely centrifugal force when the direction of the product is changed as it strikes the magnet located across the center of the flow line in the conduit and the product is forced to move around the magnet; and secondly, the magnetic forces acting on the product as it is forced to pass through a strong magnetic field whereby such magnetic particles are moved.

Another object of the invention is to provide a unitary cylindrical magnet device placed in the passage of a closed conduit so as to direct the flow of liquid around the magnet device through a restricted cylindrical space and through the strong magnetic field of the permanent magnet, which device is adapted to work under all pressures and in extraordinary high pressure lines, and wherein the cylindrical shape of the magnets traversing the direction of the flow line of the conduit attracts magnetic particles in such a manner that the particles by the velocity pressure are forced around the cylindrical magnetic surface to the trailing side of said cylindrical surface and there the eddy currents in the flow at the trailing side of the magnet aid such attracted or separated magnetic particles to be held in place on the magnet; said cylindrical magnet being easily removable from said conduit as a unit for cleaning purposes, and can be quickly set in place to completely seal the passage.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
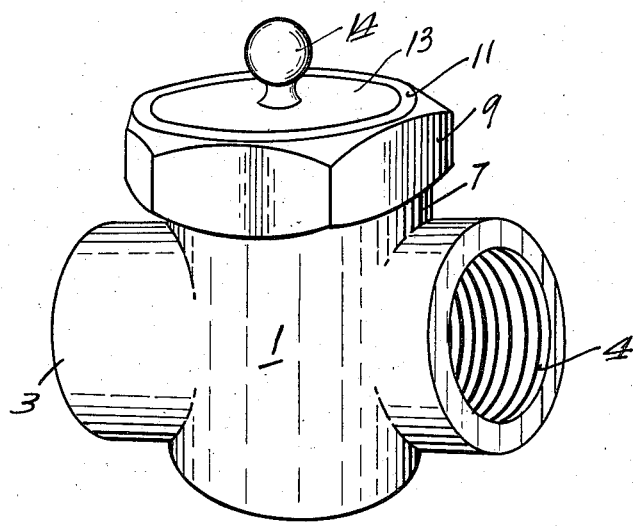
Fig. 1 is a perspective view of the assembled magnetic trap unit.
Figure 2:
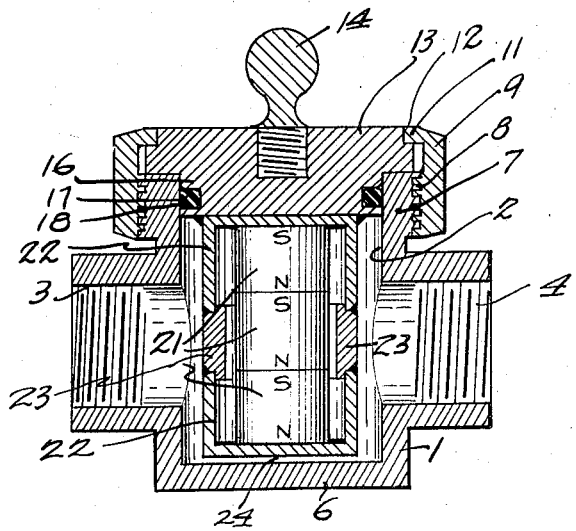
Fig. 2 is a cross-sectional view of the same.

The structural features of the illustrative embodiment of my magnetic trap include a trap body 1, which has a substantially cylindrical central cavity 2 and transverse ports or passages 3 and 4 diametrically opposite and aligned with one another and adapted, such as by threading, for connection in a closed conduit through which liquid is conducted. The bottom of the central cylindrical chamber 2 is closed by bottom wall 6. The top of said cylindrical chamber 2 has a neck 7 which has external threads 8 thereon. A nut 9 can be secured on the external thread 8 of the neck 7.

A top flange 11 of the nut 9 engages a recess 12 of a core plate 13. A lifting knob 14 is threadedly secured in the core plate 13 for facilitating the lifting of the magnet. The top of the core plate 13 rests upon the top of the neck 7. A cylindrical portion 16 of the core plate 13 fits into the cylindrical interior of the neck 7. A packing channel or groove 17 extends around the exterior of the cylindrical portion 16 and has therein a compressible gasket or elastic packing 18 to tightly seal the top of the cylindrical chamber 2.

On the magnetic core plate 13 and more particularly on the lower face of the cylindrical portion 16 is supported a series of suitable permanent magnets 21. These magnets are surrounded by a suitable housing made of a pair of opposed symmetrical core shells 22 which are connected together by a non-magnetic ring 23 forming an air gap. The shells or cups 22 are made of magnetic material and confine the magnets 21 in place. The parts of the shells 22 are secured to the non-magnetic ring or gap 23 in the center and the top shell 22 is welded or otherwise fixedly secured to the bottom face of the cylindrical portion 16 of the core plate 13 so that the entire unit can be introduced and centered in the cylindrical chamber 2 of the body 1.

The shell 22 and the gap 23 together are so ground and polished that they form a smooth cylindrical unitary surface, the outer diameter of which is either equal to or smaller than the diameter of either port 3 or 4. The outer diameter of the chamber 2 is so spaced from the outer diameter of the shells 22 as to provide ringlike space around. The bottom cup or shell 22 is also spaced from the bottom 6 of the body 1 to provide a bottom clearance or space 24.

The liquid flowing through the closed conduit under comparatively high pressure is forced to expand into the cylindrical chamber 2 and also on account of the restricted passage around the cylindrical unit formed by the connected shells 22 is forced to move on a substantially cylindrical path around the opposite sides of the core shells 22. This flow creates a centrifugal force which separates and retards the movement of magnetic particles with the liquid. The power of magnetic field created by the magnets 21 directs such separated magnetic particles so that they adhere to the cylindrical surface of the magnetic shells 22 and are ultimately swept by the velocity of the flow of the liquid to the outlet side or half of the shells 22 where eddy currents which are necessarily created as the flow is redirected into the closed conduit, create back pressure and tend to assist the magnet in holding the trapped particles on the magnetic shell surface facing toward the outlet port.

Thus the combination of forces permits the trapping of the magnetic particles such as tramp iron out of the line of flow by the utilization of velocity pressure at the back or outlet side of the magnetic shells and there it is held out of the line of flow also by a very high magnetic holding power. It is to be noted that the space around the trap chamber 2 is greater than the cross sectional area of either port to compensate for frictional resistance caused by the change of direction of flow, but as the path is narrowed it causes the product or liquid to pass closer to the powerful magnetic field.

The positioning of this magnetic cylinder transversely or at right angles to the axis of the conduit or direction of flow so as to accomplish the change of direction under high velocity pressure greatly aids in the efficient performance of this trap.

I claim:

1. In a magnetic trap of the character described, a hollow body having substantially opposite inlet port and outlet port adapted to be connected to closed conduit, a cylindrical chamber between inlet and outlet ports formed on an axis generally transverse to and in the path of the flow from said inlet to said outlet, the bottom of said chamber being closed, a core plate adapted to seal the other end of said chamber, detachable means to clamp said core plate in position, a cylindrical magnetic core shell extended from said core plate into said chamber in the path of said flow from said inlet port to said outlet port, the outer periphery of said shell forming a smooth and continuous cylindrical guiding surface and a permanent magnet confined within said core shell to create a strong magnetic field through said shell and across said entire cylindrical chamber for trapping metallic particles from the liquid flowing through said chamber, the diameter of said core being about equal the diameter of either port, and the capacity of the circumferential space in said chamber around said core being larger than the cross-sectional area of either of said ports to compensate for frictional resistance caused by the change of direction of the liquid as it travels in said chamber and around said core shell so as to subject all metallic particles through the entire liquid body to said magnetic forces.

2. In a magnetic trap of the character described, a hollow body having substantially opposite inlet port and outlet port adapted to be connected to closed conduit, a cylindrical chamber between inlet and outlet ports formed on an axis generally transverse to and in the path of the flow from said inlet to said outlet, the bottom of said chamber being closed, a core plate adapted to seal the other end of said chamber, detachable means to clamp said core plate in position, a solid cylindrical magnetic core shell extended from said core plate into said chamber in the path of said flow from said inlet port to said outlet port, and a permanent magnet confined within said core shell to create a strong magnetic field through said shell and across said entire cylindrical chamber for trapping metallic particles from the liquid flowing through said chamber, said shell having a smooth continuous cylindrical outer surface and including a pair of spaced axially aligned hollow cylindrical sections of magnetic material, and a non-magnetic ring connecting said sections, said sections and said ring being integrally united and forming a continuous, smooth cylindrical surface.

References Cited in the file of this patent

UNITED STATES PATENTS

| | | |
|---|---|---|
| 1,425,366 | Chapman | Aug. 8, 1922 |
| 2,466,839 | Caldwell | Apr. 12, 1949 |
| 2,597,561 | Blind | May 20, 1952 |
| 2,680,519 | Rundquist et al. | June 8, 1954 |
| 2,789,655 | Michael et al. | Apr. 23, 1957 |
| 2,800,230 | Thomas | July 23, 1957 |